Patented Feb. 1, 1944

2,340,343

UNITED STATES PATENT OFFICE 2,340,343

PROCESS FOR FORMING ALCOHOLS OR ESTERS

Albert S. Richardson, Wyoming, and James E. Taylor, Cincinnati, Ohio, assignors to The Procter and Gamble Company, Ivorydale, Ohio, a corporation of Ohio No Drawing. Application February 21, 1941, Serial No. 380,072

16 Claims. (Cl. 260—410.9)

Our invention relates to a process for forming alcohols or esters or both by reacting hydrogen with certain metallic salts of carboxylic acids.

This process converts a salt of a carboxylic acid, which may be represented as $(R \cdot CO \cdot O)_xM$, where R is an organic radical, M is a metallic radical of a group which will be defined, and $x$ is a small whole number, into the corresponding alcohol which may be represented as $R \cdot CH_2 \cdot OH$. These reactants may react with another molecule of the salt or with the acid radical of this salt to form the corresponding ester, which may be represented as $R \cdot CO \cdot O \cdot CH_2 \cdot R$. Under conditions hereinafter described these main reactions may be accompanied by addition of hydrogen to unsaturated carbon atoms of the R group, if this is an unsaturated group.

The main object of our invention is to form primary alcohols or their esters from the corresponding carboxylic acids or from salts or esters of these acids.

A special object is to form less unsaturated (including completely saturated, if desired) primary alcohols or their esters from more unsaturated carboxylic acids or from salt or esters of these acids.

Alcohols or esters or both suitable for use in the manufacture or synthesis of detergents, of emulsifying or wetting agents, of plasticizing agents, of waxes, of drying compositions, and the like, may be formed by this process from fatty acids derived from naturally occurring fatty oils, from rosin, from oxidation of petroleum products, or from other sources. Primary aliphatic alcohols other than the fatty alcohols, and primary aromatic alcohols, as well as esters of these alcohols may also be made by our process.

Raw materials for the process and uses for the resulting alcohols and esters are so numerous and varied that our invention will find application in the preparation of many products other than those specifically named herein.

In this specification the term "corresponding" is used to denote a similarity of the R groups of an alcohol, $R \cdot CH_2 \cdot OH$, or of its ester, $$R \cdot CO \cdot O \cdot CH_2 R$$

and of the carboxylic acid, $R \cdot CO \cdot OH$, from which these are derived. Inasmuch as saturation of double carbon bonds of unsaturated R groups of the reacting components sometimes occurs in this process, our use of the term "corresponding" and of the symbol R denotes similarity of R groups in all respects except as to the number of unsaturated carbon atoms (and hence the number of hydrogen atoms) present in the group. Thus the R group of the organic acid may be saturated with respect to hydrogen or it may contain one, two, three, or more double bonds, whereas the "corresponding" R group or groups of the resulting alcohol or ester may contain the same number or a smaller number of double bonds, unless otherwise specified.

The term "residue" is used to denote an

group of an acid, alcohol, or ester.

The term "hydrogenation" is used in a broad sense, and may include both the reduction of oxygen-containing organic groups and the addition of hydrogen to unsaturated organic compounds.

Heretofore alcohols have been made by reduction of fatty acids or their glycerides either by employing nascent hydrogen or by employing a catalyst with gaseous hydrogen. Our process of forming alcohol, which does not depend upon the employment of a catalyst, differs greatly from earlier methods. One of its special features is its relatively high reaction rate under normally preferred conditions. As a result of the rapidity of the reaction our process may be practiced on a commercial scale with equipment which is relatively small and inexpensive in proportion to its production capacity, with consequent economic advantages.

Our present process is based on our discovery that at relatively high temperature and pressure hydrogen readily reacts with carboxylates of certain metals, especially carboxylates of lead, cadmium, or copper, with liberation of water, liberation of the metal or its oxide or hydroxide, and formation of either an alcohol, or an ester, or a mixture of alcohol and ester.

When carried out under the preferred conditions herein described the alcohol residue and the acid residue of the ester which may be formed in the process are those which correspond to the acid in number of carbon atoms and configuration of carbon chains and substituent groups. When the reaction mixture includes salts of more than one carboxylic acid, mixed esters may result. It is our belief that the partial hydrogenation of the carboxylic group in the salt to form the corresponding alcohol is the primary reaction, and that the formation of ester is a subsequent and secondary reaction. In any event, our process converts the carboxylic group, —CO—O—, of the acid radical into the group —CH$_2$—O—, which is present both in the alcohol and in the ester.

When lead carboxylates are subjected to our process, relatively high yields of primary alcohols corresponding to the acid radicals of the carboxylates are obtained. Esters of these alcohols are also formed, usually in lesser amounts.

When cadmium carboxylates are subjected to our process relatively high yields of esters are obtained, these esters having alcohol and acid residues corresponding to the acid radicals of the carboxylates. The reaction products may also include the corresponding alcohols, usually in relatively small amounts especially if carboxylates of other metals than cadmium are absent.

When copper carboxylates are subjected to our process, relatively high yields of the corresponding primary alcohols are formed, accompanied by the corresponding esters usually in relatively smaller amounts. If the organic constituent of the copper carboxylates contains double carbon bonds, and especially if no appreciable amounts of other metallic carboxylates are present, addition of hydrogen at these double bonds tends to occur concurrently with the reduction of the carboxylic group. Consequently saturated alcohols and saturated esters may be produced from copper salts of unsaturated carboxylic acids, or, if desired, alcohols and esters which are unsaturated to a lesser degree may be produced from copper salts of more highly unsaturated carboxylic acids.

We have also found that when mixtures of carboxylates, the metallic constituent of which includes two or more metals, are subjected to our process, the percentage conversion of the —CO—O— group to the —CH₂—O— group is often higher than the conversion obtainable under comparable conditions with carboxylates of any one of the individual metals; furthermore, that the relative proportions of alcohols and esters produced, and the relative extent of concurrent saturation of unsaturated carbon bonds, are not readily predictable from a knowledge of the results obtained when carboxylates of the several metals of the mixture are hydrogenated individually. Mixtures of carboxylates of copper and cadmium, or cadmium and nickel, for example, give high yields of alcohols and relatively lower yields of esters. Mixtures of carboxylates of cadmium and chromium normally produce higher yields of free and combined alcohol than carboxylates of either metal when treated alone.

Carboxylates of chromium and of cobalt when hydrogenated alone under the conditions of our process have produced moderate yields of alcohols and esters. Relatively small yields of these products normally result when carboxylates of zinc, of manganese, of iron, or of nickel are hydrogenated alone; under these conditions the reaction products usually contain relatively larger amounts of the carboxylic acids themselves or of hydrocarbons resulting from the complete reduction of the carboxylic group. Mixtures of carboxylates, however, which include a plurality of these metals or one of these metals with lead, cadmium, or copper, may yield very substantial amounts of alcohols and esters, more than the amounts obtainable by hydrogenating the carboxylate of any metal of the mixture alone, a specific example of this being a mixture of chromium and zinc carboxylates.

In preparing to carry out our process we first obtain the salt of the carboxylic acid and of the chosen metal in any convenient way.

Metallic carboxylates may, for example, be formed in many cases by reacting the carboxylic acid with an oxide, hydroxide, carbonate, or other salt of the metal. A salt-forming procedure that is generally applicable for making water-insoluble carboxylates is to mix two water solutions containing equivalent amounts, respectively, of the soluble sodium salt of the carboxylic acid (which may be made by reacting the carboxylic acid or a glyceride or other ester of this acid with an aqueous solution of sodium hydroxide) and of a water soluble inorganic salt of the metal. Thus we produce a precipitate of the desired carboxylate, which we then separate from the remaining solution and wash and dry, this salt in some cases being a basic rather than a normal salt.

Another method of making metallic carboxylates which is especially convenient when the carboxylic acids are fatty acids consists in saponifying triglycerides or other esters of the fatty acids with an oxide or hydroxide of a metal. Litharge, for example, may be agitated and heated with naturally occurring triglycerides by blowing a current of steam through this mixture, thus forming lead soaps of the fatty acids of the glycerides.

To carry out the essential step of our process, we place the metallic carboxylic salt in a suitable vessel, introduce hydrogen under superatmospheric pressure, elevate the temperature, and maintain intimate contact between hydrogen and the salt until the reaction has taken place.

Instead of employing a single salt of a carboxylic acid, a mixture of a number of salts may be employed, comprising a plurality of metals or a plurality of carboxylic acids or a plurality of both.

Preferred conditions for our process include the maintenance of a temperature between about 240° C. and about 400° C. and a pressure in excess of 2000 pounds per square inch. The alcohol and ester forming reactions occur, although more slowly, at temperatures below 240° C., down to 180° C. at least. Likewise these reactions have been observed under suitable temperature conditions at pressures as low as 500 pounds per square inch. The most favorable temperature and pressure conditions cannot be more definitely stated because they vary with different carboxylates. It is well known that carboxylates vary in their stability at elevated temperature, and it is of course preferable to choose a reaction temperature for each carboxylate such that side reactions due to pyrolysis are not excessive.

Usually, especially when the object is to form alcohols in preference to esters, gaseous hydrogen is supplied to the organic salt undergoing reaction not only in amount adequate for the reaction, which is 5 mols of hydrogen per 2 mols of carboxylic group for alcohol formation, or 3 mols of hydrogen per 2 mols of carboxylic group for ester formation, (in each case without making allowance for hydrogenation of double carbon bonds), but also in sufficient excess so that throughout the reaction there will be a relative preponderance of unreacted hydrogen as compared with the water vapor.

When the object is to form esters in preference to alcohols it is sometimes expedient to hydrogenate a mixture consisting of a metallic carboxylic salt and the corresponding free carboxylic acid, this mixture containing relatively more mols of salt than of free acid, instead of hydrogenating the salt alone.

Intimate contact between the hydrogen and the reacting salts, which usually are molten at the temperature of reaction, is preferably provided by some form of agitation, although the reaction will proceed somewhat more slowly in the absence of agitation. The time required for the reaction is usually relatively short. In many cases when temperature and pressure are within the preferred ranges approximate equilibrium is reached within two or three hours, and sometimes the reaction goes substantially to completion within as short a time as five minutes after reaching the preferred temperature. Continuation of the elevated reaction temperature and pressure and continued contact with hydrogen for several hours after completion of the alcohol and ester forming reactions have not been found to influence the yields of the desired products to any appreciable extent.

After the reaction is sufficiently complete, as judged by removing and analyzing a sample or by previous experience or by other convenient method, the usual procedure is to cool the reaction mixture to a temperature such that the products will not be injured by contact with air, and to release excess vapor pressure. The non-gaseous organic reaction mixture may be decanted or filtered from such elementary metal as may be present.

The reaction products may be employed for some of their intended uses without purification. They may, on the other hand, be subjected to any desired degree of purification depending on the requirements of their subsequent use. Several optional purification treatments are mentioned herein, and others appropriate to individual cases will readily occur to those skilled in the art.

When the reaction products are water-insoluble they may be washed with dilute hydrochloric or sulphuric or other suitable mineral acid under such conditions as will remove any remaining metal which may be present in elementary form, or as oxide, hydroxide, or organic salt. The acid washed products are usually then water washed to free them of mineral acid, and they may then be filtered and dried. Distillation may be employed in addition to or as a substitute for acid washing as an optional purification step in some cases.

If a product consisting of an alcohol or mixture of alcohols substantially free from other substances is desired any one of several procedures may be followed, usually after the hydrogenation reaction products have been acid washed or otherwise separated from metals. Free carboxylic acids may be neutralized with sodium hydroxide solution. Esters present among the reaction products may be hydrolyzed or saponified by any convenient method to form the respective alcohols and either the carboxylic acids or salts of these acids. Alcohols and associated organic fluids may, if water-insoluble, be separated from solid and aqueous phases by settling or solvent extraction of steam distillation or other appropriate method. Fractional distillation may be employed to separate water-soluble alcohols.

Esters and fatty acids present among the reaction products may be reacted with an oxide or hydroxide of lead, or with a suitable mixture of metallic oxides or hydroxides, to form metallic carboxylates which may be re-subjected to our hydrogenation process to produce additional alcohol.

If, on the other hand, a product consisting of an ester or mixture of esters substantially free from other substances is desired a different purification procedure is employed. In this case the reaction products, usually after acid washing, water washing, and drying, may be analyzed to determine the amounts of free carboxylic acid and free alcohol contained therein, additional alcohol or carboxylic acid may then be added so that the total amounts of free acid and free alcohol then present in the mixture are in chemically equivalent proportions, and this mixture may then be heated under suitable conditions to esterify the acid and alcohol components. If desired, an excess of free carboxylic acid or free alcohol may be employed in the esterification step, and the excess acid or alcohol remaining may then be removed in any appropriate manner.

The following examples will provide a more detailed understanding of our process. In each of these examples the reaction was carried out in a reaction vessel consisting of a stainless steel bomb of 300 cubic centimeters capacity. The mixed fatty acids derived from coconut oil are for convenience referred to as lauric acid, and the mixed fatty acids present in commercial oleic acid, or "red oil," are referred to as oleic acid. Similar terminology is employed in speaking of the corresponding alcohols and esters.

In each of the examples dealing with fatty materials the approximate composition of the washed mixture of reaction products was calculated from the fat characteristics of this mixture, or of one of its principal components, and from the corresponding characteristics of the original mixture of fatty acids from which the soaps employed in the example were prepared.

*Example 1.*—Equivalent amounts of lead nitrate and of the mixed sodium soaps of coconut oil, each in water solution, were brought together and the resulting insoluble lead soaps were water washed and dried. One hundred grams of these soaps were placed in the bomb at room temperature, air was displaced from this vessel by admitting hydrogen and venting the bomb, and then hydrogen was introduced to build up the pressure in the bomb to 2000 pounds per square inch. The bomb was sealed and heated to about 340° C. The contents were agitated by rocking the bomb, while maintaining a pressure of 4000 pounds pressure by adding more hydrogen when necessary, for three hours. The bomb was then allowed to cool to a temperature convenient for handling, excess gas pressure was released, and the non-gaseous organic contents were removed, boiled with a 10% aqueous solution of hydrochloric acid, and water washed until free from mineral acid, filtered to remove moisture, and analyzed.

This product was found to contain about 1% of lauric acid, about 25% of lauryl laurate, and about 74% of lauryl alcohol. The product had an iodine value of 10, which indicated no significant reaction at the double bonds of its unsaturated components.

The presence of the alcohol (including both the free alcohol and that combined as ester) was confirmed by extracting it by means of a volatile organic solvent from the reaction products after same had been acid washed and saponified with caustic potash, removing the solvent by evaporation, and determining the analytical characteristics of this extract, which agreed closely with the expected values for lauryl alcohol.

Soaps of palm kernel oil or of other tropical nut oils similar to coconut oil may be substituted for soaps of coconut oil with comparable results.

*Example 2.*—A mixture of 50 gms. of cadmium oleate and 50 gms. of chromium oleate, prepared by treating sodium soaps of "red oil" with cadmium nitrate and with chromium sulphate respectively, according to the procedure described in Example 1, was subjected to hydrogenation under conditions identical to those of Example 1 except that the reaction pressure was 3600 pounds per square inch.

The resulting washed product was found, by completely saponifying with an alcoholic potash solution, extracting with petroleum ether, and determining the hydroxyl value of the resulting unsaponifiable extract, to contain about 90% of free and combined oleyl alcohol.

When hydrogenated separately under similar conditions 100 gms. of cadmium oleate yielded only 41% of free and combined alcohol in the reaction product, and 100 gms. of chromium oleate yielded only 27%.

*Example 3.*—Cadmium oleate prepared by treating red oil sodium soaps with cadmium nitrate according to the procedure described in Example 1, was subjected to hydrogenation under conditions identical to those of Example 1 except that the reaction pressure was 3000 pounds per square inch.

The resulting acid washed and water washed product contained about 19% of free oleic acid, about 74% of oleyl oleate, and about 6% of oleyl alcohol. The unsaponifiable matter had an iodine value of 92, indicating less than 5% hydrogenation of double bonds in the free and combined alcohols.

*Example 4.*—100 gms. of copper oleate, under hydrogenation conditions similar to those of Example 1 except that the time at the reaction temperature and pressure was only fifteen minutes, yielded a washed product containing about 99% free and combined alcohol. The iodine value was 13.7, indicating that all but about 14% of the olefine double bonds were saturated. In a similar example, in which the time at the reaction temperature and pressure was one hour, saturation of 96% of these double bonds occurred.

*Example 5.*—175 grams of lead acetate were agitated in the reaction vessel with hydrogen at an initial pressure of 2000 pounds per square inch. The temperature of the reaction vessel was gradually increased, from room temperature to 300° C., over a period of 80 minutes, during which time the agitation was continued. The pressure in the vessel increased from the starting pressure to 2900 pounds per square inch. When the temperature reached 300° C., the vessel was cooled and the products of the reaction were removed. The non-gaseous products consisted of a solid mixture of metallic lead and lead acetate, and a liquid which contained about 50% of ethyl alcohol and which also contained some lead acetate and some ethyl acetate.

*Example 6.*—100 grams of lead benzoate were hydrogenated under conditions identical with those of Example 1, except that the time at the reaction temperature and pressure was only one hour.

The non-gaseous products consisted of metallic lead and a two phase liquid, one phase of which contained about 70% benzyl alcohol.

*Example 7.*—100 grams of lead salts of castor oil mixed fatty acids (including a predominant proportion of ricinoleic acid) were hydrogenated by agitating these salts in the presence of hydrogen, while heating the reaction vessel from room temperature to 340° C. during the course of 100 minutes. During this time the pressure rose from an initial hydrogen pressure of 2000 pounds per square inch to 2500 pounds per square inch. The non-gaseous products were acidulated and water washed. The resulting product had a saponification value of 45.9, indicating that the carboxylic groups of approximately 76% of the fatty acid radicals had been hydrogenated. The product upon saponification with potassium hydroxide and extraction with petroleum ether yielded an unsaponifiable portion that had a hydroxyl value of 315 and an iodine value of 79.5. These values, together with the known approximate composition and characteristics of the castor oil fatty acids, indicated the presence of about 57% of dihydroxy alcohol having a chain of 18 carbon atoms and about 43% of the corresponding monohydroxy alcohol, and indicated that about 88% of these alcohols contained one olefin double bond and that the remainder were saturated alcohols.

*Example 8.*—A mixture of 90 gms. of cadmium oleate and 10 gms. of nickel oleate was subjected to hydrogenation under conditions similar to those of Example 1 except that the time at the elevated reaction temperature and pressure was only one hour.

The resulting acid washed and water washed product contained less than 1% of free oleic acid, about 80% of free oleyl alcohol, and about 5% of oleyl alcohol combined as ester. The iodine value of the product was 75, indicating that about 79% of the double carbon bonds remained unsaturated.

When nickel oleate alone was hydrogenated under similar conditions no significant amount of free or combined alcohol was formed.

Our process is capable of application to many varied raw materials to produce many useful products. Fatty alcohols, which may be sulphated or sulphonated for use in detergents or wetting agents or emulsifying agents, may for example be made from fatty oils or their fatty acids.

This process may also be employed to form alcohols or esters or both from rosin acids, or from mixtures of rosin acids and fatty acids. These products, and also unsaturated alcohols and unsaturated esters made by our process from fatty acids derived from drying oils, may be used in the preparation of improved drying compositions for use in paint, varnish, and related products.

Another use for this process is in the manufacture of synthetic waxes, composed principally or entirely of esters of fatty acids and high molecular weight alcohols. Convenient raw materials for use in making synthetic waxes are fatty acids derived from glyceride oils and rosin acids. Either saturated or unsaturated acids may be employed. If unsaturated acids are employed either an unsaturated and relatively low melting wax may be formed by employing cadmium or lead, or a suitable mixture of metals in the soap making and hydrogenating steps; or a substantially saturated and relatively high melting wax may be formed by employing copper in the soap making and hydrogenating steps in order that saturation of double bonds as well as ester formation will occur. The melting point and related properties of the product may thus be controlled both by choice of raw materials and by the degree of saturation of double bonds that is caused to occur during the treatment with hydrogen.

Having thus described our invention, what we claim and desire to secure by Letters Patent is:

1. The process which consists essentially in subjecting metallic carboxylates to reaction with hydrogen, the metallic constituent of said carboxylates comprising a substantial proportion of a metal selected from the group consisting of lead, cadmium, and copper, and the reaction temperature and hydrogen pressure being sufficiently above atmospheric to effect substantial reduction of the carboxylic group, —CO—O—, of said carboxylates to the group, —CH₂—O—, with resulting formation of a product of the class consisting of primary alcohol and ester thereof.

2. The discrete process step which consists essentially in subjecting metallic carboxylates to reaction with hydrogen at a temperature between about 180° C. and about 400° C. and under a sufficient pressure, at least 500 pounds per square inch, to hydrogenate the carboxylic group, —CO—O—, to the group —CH₂—O—, the metallic constituent of said carboxylates comprising a substantial proportion of a metal selected from the group consisting of lead, cadmium, and copper.

3. The process of forming primary alcohol and ester of said alcohol from corresponding metallic carboxylates which comprises reacting hydrogen with said carboxylates without added catalyst at a temperature between about 240° and about 400° C. and at a pressure above 2000 pounds per square inch, the metallic constituent of said carboxylates comprising a substantial proportion of a metal selected from the group consisting of lead, cadmium, and copper.

4. The process of forming reaction products of the group consisting of a primary alcohol of the series $C_nH_{(2n+1)}CH_2OH$ and the corresponding ester of the series $C_nH_{(2n+1)}COOCH_2C_nH_{(2n+1)}$ by hydrogenating a metallic salt of the corresponding carboxylic acid of the series $C_nH_{(2n+1)}COOH$ which comprises subjecting said salt to contact with hydrogen at a temperature between about 240° and about 400° C. and at a pressure above 2000 pounds per square inch, without added catalyst, the metal of said salt being selected from the group consisting of lead, cadmium, and copper.

5. The process of producing alcohol from a carboxylic acid ester which comprises: saponifying said ester with a basic reacting compound of a metal selected from the group consisting of lead, cadmium, and copper, thereby forming the corresponding metallic salt of the acid residue of said ester and liberating the alcohol of said ester; and subsequently reacting said salt with hydrogen at a temperature between about 240° and about 400° C. and at a pressure above 2000 pounds per square inch, thereby forming alcohol corresponding to the acid residue of said ester.

6. The process of producing primary alcohols which comprises the steps of: reacting hydrogen without added catalyst with metallic salts of carboxylic acids corresponding to said alcohols at a temperature between about 240° and about 400° C. and at a pressure above 2000 pounds per square inch, the metallic constituent of said salts comprising a substantial proportion of a metal selected from the group consisting of lead, cadmium, and copper; saponifying the saponifiable components of the non-gaseous reaction products of said hydrogenating step; and separating said alcohols from the resulting mixture.

7. The process of producing an ester which comprises reacting hydrogen, at a temperature between about 240° and about 400° C. and at a pressure above 2000 pounds per square inch, with a mixture of a fatty acid and a cadmium soap of said acid, said mixture containing relatively more mols of said soap than of said acid.

8. The process of producing a wax which comprises the discrete step of reacting hydrogen, at a temperature between about 240° and about 400° C. and at a pressure above 2000 pounds per square inch, with soaps, the metallic constituent of said soaps including a substantial proportion of a metal selected from the group consisting of lead, cadmium, and copper.

9. The process which comprises reacting hydrogen with lead salts of mixed fatty acids consisting principally of lauric and myristic acids at a temperature between about 240° and about 400° C. and at a pressure above 2000 pounds per square inch, whereby reaction products of the group consisting of alcohols corresponding to said fatty acids and esters of said alcohols are formed.

10. The process of producing a mixture of fatty alcohols which comprises: reacting a fatty oil with litharge and steam to form a mixture of the corresponding lead soaps; and reacting said mixture of lead soaps in a molten condition with hydrogen at elevated temperature and pressure.

11. The process of forming reaction products of the group consisting of primary fatty alcohol and ester of said alcohol which comprises the discrete step of reacting hydrogen at elevated temperature and pressure with copper soap of the corresponding fatty acid.

12. The process which comprises the discrete step of reacting hydrogen with molten copper soaps of unsaturated fatty acids at elevated temperature and pressure, whereby less unsaturated reaction products of the group consisting of fatty alcohols corresponding to said fatty acids and esters of said alcohols are formed.

13. The process which comprises subjecting to reaction with hydrogen at high temperature and pressure a mixture initially consisting substantially exclusively of metallic salts of carboxylic acids, to form products consisting predominantly of the corresponding primarly alcohols and esters thereof, the metallic constituent of said salt comprising a substantial proportion of a metal selected from the group consisting of lead, cadmium and copper.

14. The process claimed in claim 1, in which the carboxylic acid is a fatty acid.

15. The process which comprises subjecting a lead salt of a saturated aliphatic acid to reaction with hydrogen at a reaction temperature and hydrogen pressure sufficiently above atmospheric to effect substantial formation of a product of the class consisting of the primary alcohol corresponding to said carboxylic acid and ester of said alcohol.

16. The process which consists essentially in subjecting aromatic metallic carboxylates to reaction with hydrogen, the metallic constituent of said carboxylates comprising a substantial proportion of a metal selected from the group consisting of lead, cadmium, and copper, and the reaction temperature and hydrogen pressure being sufficiently above atmospheric to effect substantial reduction of the carboxylic group, —CO—O—, of said carboxylates to the group, —CH₂—O—, with resulting formation of a product of the class consisting of primary alcohol and ester thereof.

ALBERT S. RICHARDSON.
JAMES E. TAYLOR.